United States Patent [19]

Staudenrausch et al.

[11] Patent Number: 4,723,581
[45] Date of Patent: Feb. 9, 1988

[54] PROCESS AND APPARATUS FOR DRAWING OFF DEFORMABLE MASSES CONTAINING AIR

[75] Inventors: Georg Staudenrausch; Thomas Handtmann, both of Biberach; Manfred Kern, Ummendorf; Jürgen Schraivogel, Biberach; Georg Zinser, Winterstettenstadt; Franz Abt, Schemmerhofen; Siegfried Reutter, Eberhardzell; Einar Fesseler, Maselheim-Ellmansweiler, all of Fed. Rep. of Germany

[73] Assignee: Albert Handtmann Maschinenfabrik GmbH & Co., KG, Biberach, Fed. Rep. of Germany

[21] Appl. No.: 941,816

[22] Filed: Dec. 15, 1986

[30] Foreign Application Priority Data

Dec. 16, 1985 [DE] Fed. Rep. of Germany ....... 3544448

[51] Int. Cl.$^4$ ............................................... B65B 3/04
[52] U.S. Cl. .......................................... 141/5; 141/27; 141/258; 17/38; 99/513; 100/145
[58] Field of Search ...................... 141/1–12, 141/37–66, 250–284, 18–27; 17/35–42; 100/145; 99/513

[56] References Cited

U.S. PATENT DOCUMENTS

4,317,259  3/1982  Wagner ................................. 17/38
4,457,348  7/1984  Mueller et al. ..................... 141/25

Primary Examiner—Houston S. Bell, Jr.
Attorney, Agent, or Firm—Finnegan, Henderson, Farabow, Garrett & Dunner

[57] ABSTRACT

A process and apparatus for drawing off deformable masses containing air, such as sausage masses. The mass is transferred in a stream from a supply space into a filling cylinder where a vacuum is generated relative to the space to remove air from the mass, and the transferred mass is then ejected from the filling cylinder by means of a piston. To transfer the mass quickly and remove air from it completely, the mass stream is guided, during its transfer into the filling cylinder in such a way that, as it enters the filling cylinder, it first moves towards the cylinder wall at an angle to the direction of the piston. Moreover, during filling the level of mass in the filling cylinder is maintained at an essentially constant filling height so that a constant volume of free space remains above the mass in the filling cylinder.

16 Claims, 4 Drawing Figures

PROCESS AND APPARATUS FOR DRAWING OFF DEFORMABLE MASSES CONTAINING AIR

BACKGROUND OF THE INVENTION

The invention relates to a process for drawing off deformable masses containing air, especially for drawing off sausage, in which the mass is transferred in a stream from a supply space into a filling cylinder where a vacuum is applied to remove air from the mass, and in which the transferred mass is then ejected from the filling cylinder by means of a piston arranged in the cylinder.

The invention also relates to an apparatus for carrying out such a process, having a filling funnel with a filling cylinder connected to the filling funnel via an orifice closable by means of an inlet slide. A piston is arranged in the filling cylinder which has a slide-controlled outlet orifice through which the mass conveyed from the filling funnel into the filling cylinder can be ejected in meterable quantities by controlling the piston stroke. Further means are provided for placing the filling cylinder under vacuum when it is filled with mass from the filling funnel.

A process and apparatus of this type is known from European Patent published Application No. 129,703. There, the mass to be drawn off is first introduced into a filling funnel. After the filling funnel has been closed with a cover, a vacuum is generated in the filling funnel. The introduced mass is stirred by an agitator to ensure that air bubbles included in the mass escape. The filling funnel is separated from the filling cylinder by an inlet slide at the bottom of the filling funnel.

To prepare the filling cylinder for filling with the mass located in the filling funnel, the piston of the filling cylinder is moved downwards to generate a vacuum in the cylinder. The pressure than obtained in the filling cylinder is at least maintained by a vacuum pump connected to the cylinder. The inlet slide is then opened, and the mass in the filling funnel is sucked into the filling cylinder as a result of the pressure difference between the filling funnel and the filling cylinder. As it passes through the inlet slide into the filling cylinder, the mass separates as a result of the pressure difference obtained and the high transfer speed. As a result, any residual air bubbles included in it escape from the mass and are sucked off by the vacuum pump. Filling of the cylinder takes place until the filling cylinder is completely filled up and then the inlet slide is closed. Subsequently, a slide in an outlet orifice of the filling cylinder is opened, and the mass to be drawn off, now located in the filling cylinder, is ejected through the outlet orifice by controlling the piston stroke, in order, for example, to fill a tube of sausage skin or cans.

However, this known process and the apparatus described have some disadvantages.

Although it is possible, because of the pressure difference generated between the filling funnel and the filling cylinder, to transfer the mass to be drawn off from the filling funnel into the filling cylinder at a relatively high speed, this being advantageous to achieve a high filling capacity, nevertheless this does not guarantee that air will be removed to a sufficient extent from the air-containing mass. This is because the volume maintained under vacuum in the filling cylinder changes continuously during the filling operation as the level of the introduced mass increases gradually from the cylinder bottom until the filling cylinder is full. Thus the free cylinder volume will gradually decrease. However, it is impossible to maintain a constant and uniform vacuum in a constantly changing volume, so that differing conditions arise on the surface of the mass depending on the filling level, and hence a uniform evacuation of air from the inflowing mass is not possible.

An even more serious disadvantage is that, when the slide is opened, the mass to be drawn off falls from the funnel into the filling cylinder particularly in the direction of the main axis of the cylinder. The mass stream, when it enters, at the same time brings air with it into the mass already present in the filling cylinder. The mass stream falling in sinks relatively deep into the mass already present, thus producing relatively deep air inclusions inside the mass which can no longer be eliminated by the vacuum in the remaining volume of the cylinder not yet filled up.

The higher the inflow speed and the more fluid the mass is to be drawn off, the more serious these problems become.

A further disadvantage is that a vacuum has to be generated in the filling funnel itself, in order to obtain a sufficient evacuation of air from the mass to be drawn off. A particular disadvantage of this, beside the equipment and lines additionally required for the purpose, is that the filling funnel cannot be filled at any time desired, because to do this the funnel first has to be aerated and the cover then has to be removed. After filling, the necessary vacuum then has to be generated once again before transfer of the mass to the filling cylinder.

Finally, a further disadvantage is that the filling speed cannot be controlled accurately. In principle, although the drawing-off speed can be influenced by preselecting a specific pressure difference between the filling funnel and the filling cylinder, it is nevertheless impossible to have an accurate control because the filling speed is also dependent on other variables, especially the consistency of the particular mass to be drawn off. Since the filling speed is controlled by means of the pressure difference, fluctuations in the differential pressure can be recognized directly by corresponding fluctuations in the filling speed. On the other hand, since the filling speed acts in turn on the degree of evacuation of the sausage mass, fluctuations in the differential pressure likewise prevent a uniform removal of air from the mass to be drawn off.

SUMMARY OF THE INVENTION

An object of the present invention is to provide a process and an apparatus of this type wherein the deformable mass containing air can be drawn off quickly, continuously and with a uniformly high degree of evacuation.

This object is achieved in accordance with the present invention by providing a process for drawing off deformable masses containing air in which the mass is transferred in a stream from a supply space into a filling cylinder where a vacuum is generated relative to the supply space to remove air from the mass, and in which the transferred mass is then ejected from the filling cylinder by a piston arranged in it, the improvement comprising transferring the mass into the filling cylinder so that when it first enters the filling cylinder it is guided towards a wall of the cylinder at an angle to the shifting direction of its piston, and, during the filling of the cylinder with the mass, maintaining an essentially constant filling height, so that, during filling, an essentially constant free space remains above the mass in the filling cylinder.

The invention also provides apparatus for drawing off deformable masses containing air from a supply of mass and ejecting it in meterable quantities comprising a filling funnel for holding a supply of the mass, a filling cylinder having a piston arranged therein and connected to the filling funnel via an inlet orifice for drawing mass from the funnel into the cylinder upon movement of the piston away from the funnel, a slide for regulating the opening of the orifice and an outlet orifice in the cylinder through which mass in the cylinder can be ejected by controlling the stroke of the piston, said inlet orifice being located and shaped so that it directs the mass stream passing through it from the funnel to the cylinder toward and against a wall of the cylinder, means for drawing a vacuum in the filling cylinder to remove air from the mass, means for sensing the level of mass in the cylinder during the filling of the cylinder and means responsive to the sensing means for regulating the opening of the inlet orifice and/or the stroke of the piston to maintain an essentially constant volume of free space above the level of mass in the cylinder during filling.

BRIEF DESCRIPTION OF THE DRAWINGS

The invention is explained and described in further detail below with reference to the drawings in which.

DETAILED DESCRIPTION OF THE INVENTION

Figure 1:
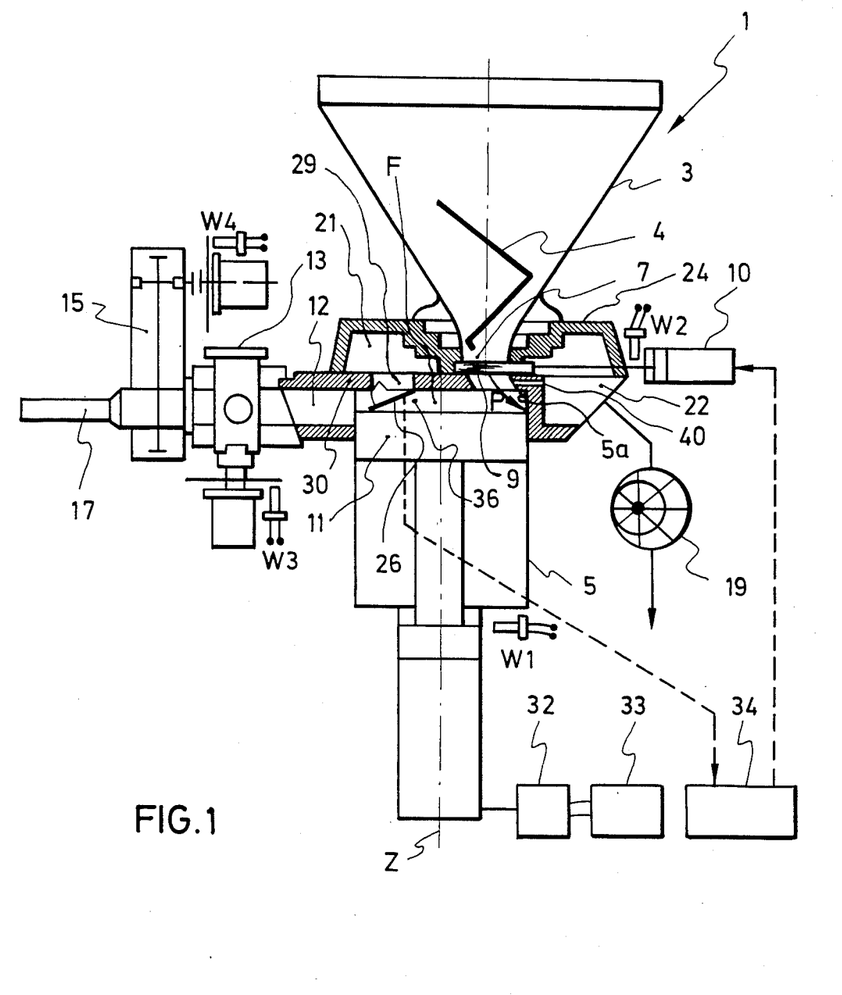
FIG. 1 is a diagramatic sectional view of a first embodiment of the invention.

FIG. 1 illustrates diagrammatically, in section, an apparatus 1 according to the invention for drawing off deformable masses. The apparatus has a filling funnel 3 open at the top and an outlet at the bottom having an orifice 7 which opens into the interior of a filling cylinder 5. Arranged in the filling funnel 1 is a feed baffle 4 which, when made to rotate, conveys towards the orifice 7 the mass which is in the filling funnel and which is to be transferred into the filling cylinder.

An inlet slide 9 is located in orifice 7 and is designed as a flat slide, which, depending on its position, can close off or open up orifice 7 to a greater or lesser extent. Inlet slide 9 is controlled by a piston drive 10 which can be operated by pressure in either direction. The design of inlet slide 9 and orifice 7 is described in more detail below.

Filling cylinder 5, in which a piston 11 is guided, is arranged underneath filling funnel 3. An outlet orifice 12 leads laterally from the upper part of filling cylinder 5 to an outlet valve 13 represented as a rotaty slide. Rotary slide 13 connects filling cylinder 5 to a filling tube 17, having a shut-off mechanism 15. Instead of the shut-off mechanism, a filling tube for cans or an accessory machine for dividing the mass into portions can also be connected to the filling cylinder.

Filling cylinder 5 is closed off at the top by a cover 30 and orifice 7 is arranged in this cover and is offset laterally relative to the main axis 2 of the cylinder. On the other side, also offset laterally relative to the main axis of the cylinder 4, is an orifice 29 which opens into a cavity 21 surrounded by a shroud 24. This space communicates with a space 22, to which a means for generating a vacuum such as a vacuum pump 19 is connected.

Orifice 29 leading from space 21 into filling cylinder 5 can be closed by a valve 26 designed as a pivoting flap valve. Valve 26 serves also as a sensing means for detecting the filled level of mass in filling cylinder 5. The pivoting flap 26 is designed so that it floats on the introduced mass. By detecting the angular position of the pivoting flap, for example by means of a potentiometer, it is thus possible to determine from the position of the pivoting flap the level of mass in the filling cylinder and consequently, in the region of the pivoting flap, the free space present between the mass and cover 30.

Signals from the potentiometer are transmitted to a regulating means 34 and there are compared with a desired preselectable filling-level mark. In the event of deviations from the desired filling level or from the desired size of the free space, regulating means 34 transmits signals to actuate the piston drive 10 of inlet slide 9 to move the inlet slide in such a way that a free space of approximately constant size is maintained during the entire operation of filling filling cylinder 5 with mass from filling funnel 3.

Space 21 and space 22 connected to the connection side of the vacuum pump 19 serve at the same time as a vacuum pressure-compensating space and provide a buffer against sharp pressure fluctuations. They also serve as a water separator.

The mass is fed from filling funnel 3 into filling cylinder 5 in such a way that, after passing through the orifice 7, as indicated by the arrow P, the mass is first guided towards the cylinder wall 5a immediately behind the inlet orifice. Thus, the inflowing mass does not enter the cylinder space in the direction of the main axis Z of the cylinder, but at an angle to it.

Figure 2:
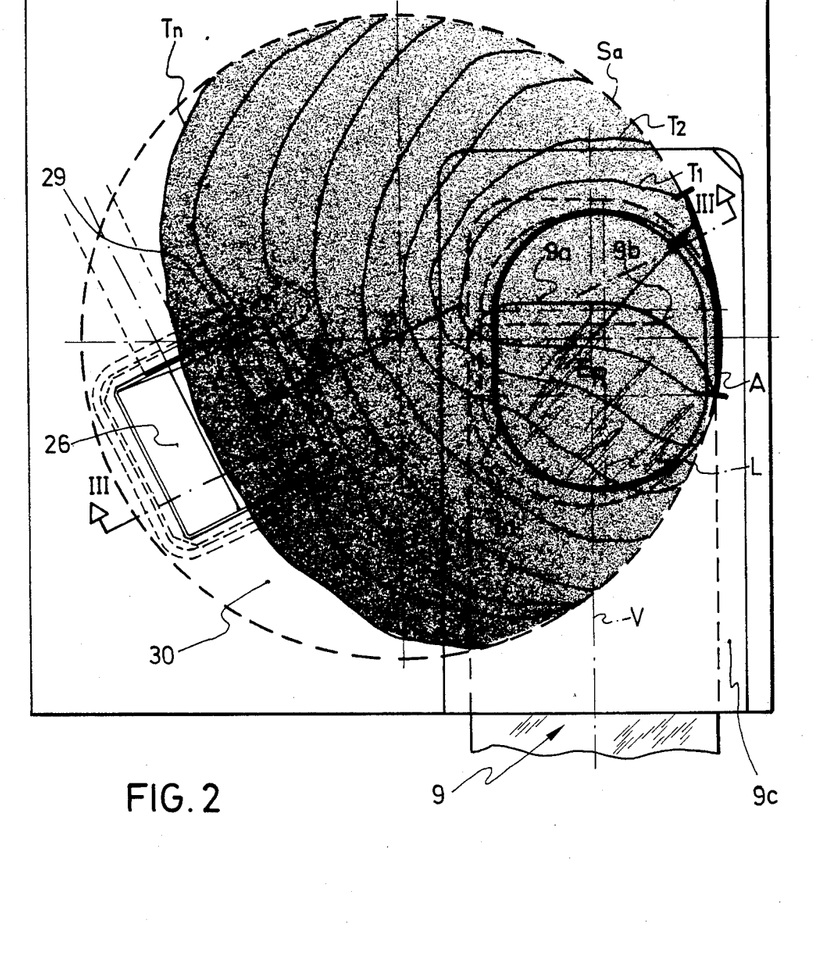
FIG. 2 is a plan view of the cover of the cylinder, the arrangement of the orifice and of the valve and the spreading of the inflowing mass stream in the filling cylinder being indicated.

This can be seen in detail in FIG. 2 which is a plan view of the cover 30 of the filling cylinder 5.

It can be seen there that the orifice 7 is offset laterally relative to the main axis Z of the cylinder in the edge region approximately adjacent to the cylinder wall 5a. The orifice 7 is in the shape of an elongated oval and the contour of the orifice bears the reference symbol 7a. Underneath the orifice, inlet slide 9 is guided in a guide plate 9c. The shifting direction V of inlet slide 9 is along a secant through the cylinder which is parallel to the long axis L of elongated orifice 7. The opening of orifice 7 is controlled by the front edge 9a of inlet slide 9. As can be seen, front edge 9a of inlet slide 9 is provided with a rounded portion 9b towards the cylinder wall 5a. This special design of elongated orifice 7 and of the front edge of the inlet slide means that, in the slide position shown, the incoming mass will flow into the cylinder from above, with a component of it being inclined towards the cylinder wall 5a in the direction of arrow $E_R$. Thus, the inflowing mass first rests against the cylinder wall 5a over the more thickly marked region A of the cylinder wall 5a. Further spreading of the mass in time in the cylinder is represented by the time lines $T_1$, $T_2$ to $T_n$. According to this illustration, the mass then spreads out so that its fronts extend along these lines shown at successive time intervals. The spreading direction of these fronts is represented, by the arrow $P_A$. The slide is never opened completely, and it therefore performs its deflecting function even when it is retracted furthest, this being the case when relatively viscous masses are to be drawn off. The slide always covers the passage orifice in such a way that the deflecting function is always performed.

The deflection of the mass stream towards the wall of the filling cylinder when it enters the latter, ensures that the mass stream flows approximately obliquely from above towards the cylinder wall so that there forms there a hill of sausage mass which runs off obliquely downwards as in an overflow, with a result that each new volume flowing in always remains on the surface and can be evacuated as effectively as possible by the vacuum in the free space because of the large surface and the relatively small layers. This oblique flow of the mass against the cylinder wall avoids the danger that the mass rushing in may penetrate deep into the mass already present and could at the same time carry air bubbles down with it.

Located opposite the orifice 7 controlled by the inlet slide, and approximately symmetrical relative to spreading direction $P_A$, is the pivoting flap 26 which, in the open position, connects the cylinder's interior to the vacuum and which, on the other hand, performs the function of a sensor detecting the fill ing level. As a result of this arrangement, this pivoting flap is located in a region which the inflowing mass stream reaches last. In this region it is therefore possible, by sensing the pivoting position of the flap, to ensure that the inlet slide is regulated so that this region is never filled up completely, that is to say, a constant free space 36 is maintained in this region. Thus, in this region the filling level is kept approximately constant, so that the free space also remains constant. This is shown more clearly in FIG. 3.

Figure 3:
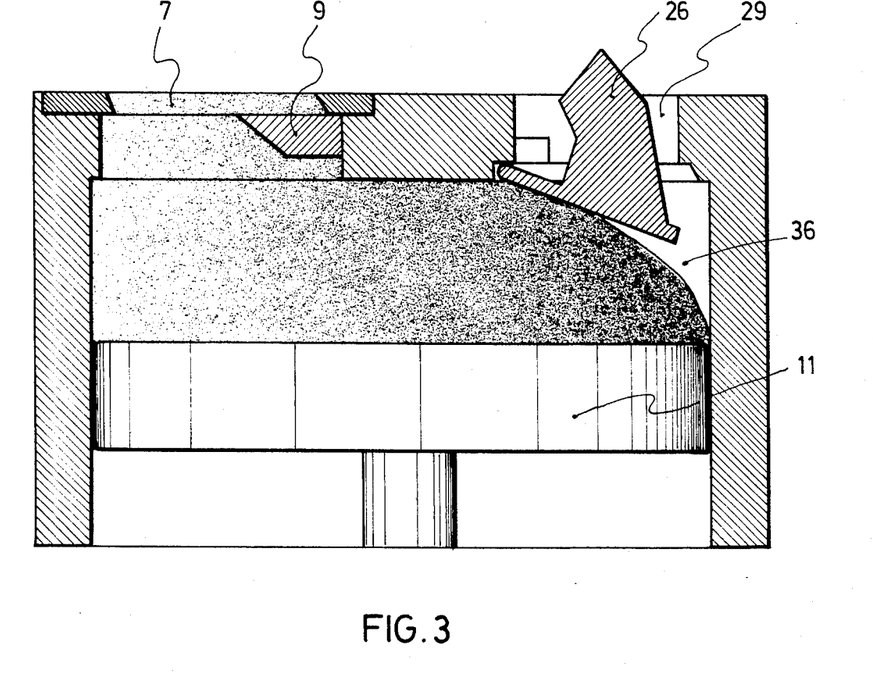
FIG. 3 is a sectional view taken along the line III—III of FIG. 2.

The mass stream flowing in thus always encounters the same evacuation conditions during the entire filling operation, because the filling level is maintained constant. At the start of the filling operation, the piston is moved upwards as far as possible and then moves downwards during filling, the consequently enlarging volume being filled up with inflowing mass in co-ordination with the downward movement of the piston, so that the filling level in the filling cylinder is kept essentially constant during the entire filling operation.

At the same time, the drawing off is regulated so that constant free space remains in the filling cylinder. This free space is evacuated continuously. Because the free space is kept essentially constant in terms of its volume, the vacuum system has to remove a relatively small, but constant volume during the entire filling operation, and this can take place very uniformly. As a result, the entire mass to be drawn off is subject to the same conditions as regards the evacuation of included air bubbles, so that a very uniform removal of air can be achieved.

As a result of these features, it is no longer necessary to evacuate air as in the past in the filling funnel, since because of the procedure described, and particularly because of the specific route for the mass stream to be drawn off, excellent evacuation can be obtained simply by transferring the mass stream along this route.

In order to carry out the process according to the invention, the apparatus operates as follows:

First, funnel 3 is filled, either by hand or by means of a siphon device, with the air-containing mass such as sausage or the like to be divided into portions or to be drawn off. At this time, inlet slide 9 is closed. Piston 11 is also moved completely upwards so that the free volume between cover 30 and the surface of piston 11 is zero and the pivoting flap valve 26 is thus also closed by the piston. The position of the piston or the control of the piston stroke is monitored by the path measuring system W1 (see FIG. 1). To transfer the mass from the interior of funnel 3 into cylinder 5, the piston now starts its downward movement. At the same time, pivoting flap 26 acting as a non-return valve drops and connects the vacuum generated by pump 19 to the cylinder's interior. Spaces 21 and 22 and also the cylinder's interior are thus evacuated by means of the vacuum pump 19. The outlet slide 13 is closed at this time. The rear side of the piston is also evacuated in a way not shown in detail.

At the same time as the piston starts its downward movement, inlet slide 9 is opened. As a result of the vacuum generated inside the cylinder, the mass introduced into the filling funnel 3 is sucked through orifice 7 into the filling cylinder and at the same time it is deflected towards the cylinder wall 5a according to the route it is forced to follow. From there, the mass spreads in a direction toward the pivoting flap in a broad stream fanning out, as shown in FIG. 2. During this entire operation, air is being removed from the mass. The escaping air is sucked off via a channel 40 which is located near inlet slide and into cavity 22 and also via the orifice 29 exposed by the pivoting flap 26. As noted, orifice 29 is diametrically opposite the point of impact of the mass stream on the cylinder wall and at the highest point of the filling cylinder. The mass runs from its point of impact on the cylinder wall to the side of the cylinder wall located opposite the point of impact, at the same time forming a "hill crest". Here, the free space has its largest volume, because it is at the greatest distance between the introduced mass and the cylinder cover.

The free space is maintained at a constant value during filling by detecting the position of the pivoting flap, which at the same time serves as a sensing means and by regulating the position of inlet slide 9 which controls the cross section of the orifice 7 through which the mass enters the cylinder. It would also be possible to keep the cross-section of the orifice through which the mass stream enters constant and carry out the above described regulation of the free space by appropriate control of the downward movement of the piston.

This piston now moves further down, and as it does so the interior of the cylinder increases in size and fills up with the mass. The mass always follows the above-described route while at the same time it is evacuated uniformly and with high efficiency.

During the gradual downward movement of piston 11, the free space above the mass remains essentially constant. This ensures that, irrespective of how far the piston 11 has already moved down, there is always a constant volume or a constant free space 36 to be evacuated, thus resulting in a uniform evacuation of air throughout the entire drawing-off operation.

So that the regulation of the free space can be matched to differing preconditions, such as, for example, a high or low vacuum, pasty or fluid masses, etc., the time elapsing from the first opening of inlet slide 9 to the first floating of pivoting flap 26 in the starting phase is measured. Regulating conditions are then selected as a function of this time and are stored, for example, in a microprocessor (not shown) which then regulates the functions for the further filling cycles.

For relatively fluid masses or when there is a high vacuum the filling time elapsing between the opening of the inlet slide and the first floating of the pivoting flap is considerably less than, for example, in the case of relatively viscous masses or when there is a lower vacuum. The time which therefore elapses between the opening of the inlet slide and the first floating is consequently a variable, from which the ideal regulating conditions can be derived for a particular case. This detection of the mass is carried out after the start of each work cycle (batch change, change of vacuum) and then remains stored for those filling cycles in which the mass located in the filling funnel is subsequently drawn off. In practice, it may be sufficient to design the machine so that it operates in three different ranges intended respectively for thin, medium and thick masses. For the test stroke which is intended to ascertain what type of mass is present, the machine is then advantageously run up under conditions to be used for medium masses. As a result of the time measurement carried out, the machine can then determine whether the range is correct or whether there should be a change-over to the range for relatively viscous masses or to that for relatively fluid masses. As a result of this procedure, one test stroke is sufficient to make it possible to determine the particular regulating conditions which are appropriate. During the regulating operation, for example even the presence of a very glutinous mass can be allowed for if the filling stroke of the piston is slowed down so that the air has time to escape from the mass under vacuum.

This can then prevent the glutinous mass ocntaining air from foaming and expanding under vacuum. It can also be beneficial, in this respect, to determine the content of residual air and adjust the vacuum accordingly. This can be carried out in the filling cylinder itself or, for example, can also be achieved if the change in volume of the mass under pressure is monitored in a measuring cylinder. For this purpose, there can be a special separate space in the machine, in which an appropriate test measurment can be made by means of a specific test stroke before the actual drawingoff operation, in order to determine the content of residual air. The result can then be taken into account in the regulating operation by adjusting corresponding parameters.

Piston 11 now moves down until filling cylinder 5 is full, with the exception of the free space 36. The inlet slide 9 now closes immediately. The closing position and the particular intermediate positions of the inlet slide 9 are detected by means of the path-measuring system W2 for the slide.

In this position, the free space still remains connected to the vacuum, that is to say, the pivoting flap 26 is still open, as shown in FIG. 3.

For the ejection movement, the piston is then moved upwards and in doing so it thereby displaces the remaining air above the mass. Since the pivoting flap is arranged in such a way that, during the upward thrust of the mass the pivoting flap only closes completely when the free space 36 has been reduced to zero, the pivoting flap 26 closes only after all the air has been drawn off completely from the free space and there is no longer any free space.

After a specific upward movement of the piston, therefore, the air has escaped completely from the cylinder interior, the inlet slide and the pivoting flap 26 close the corresponding orifices 7 and 29, and the outlet slide is also closed.

To obtain a constant filling stream from the outset, the pressure prevailing in the cylinder 5 must remain virtually constant for the entire filling period. This is achieved by means of a pressure build-up effected before the actual start of ejection. This can be carried out by waiting until a present pressure value has built up before the outlet slide 13 opens.

The value of the filling-up pressure required can also be redefined after the beginning of each work cycle (batch change or change in work rate) by means of a measuring operation in the starting phase. This means that the first filling of the cylinder is started without a pressure build-up, that is to say, at the same time as the piston moves upwards the rotary slide 13 is also opened. The pressure which is thereby established in the cylinder space is detected by means of a pressure sensor 32. This pressure gradually increases and then rises to a constant pressure value which is stored in a control unit 33. During each further filling of the cylinder, this stored pressure value is then used as a preset value for the pressure build-up, that is to say, during the further fillings of the cylinder the outlet slide 13 remains closed until the pressure reaches the stored value. The outlet slide 13 then opens, and the mass is ejected under a constant pressure in a constant filling stream at a preset speed.

Division into portions is carried out by moving the piston 11 in steps, its portioning stroke for the ejection speed being detected by the path-measuring system W1 and being regulated by means of a servo-value via a digital electronic control (not shown). The rotary slide 13 is opened at the start of each ejection of a portion and is closed again after the end of this ejection. In the filling interval, the sausage casing can be shut off by means of shutoff device 15. At the same time, a pulse generator W4 detects the actual value of the shut-off rate which is compared in a control device with a set desired value.

As soon as the cylinder volume falls below the set portion size, portioning is stopped and the inlet slide is opened again. The remaining mass is thereby forced back into the funnel. The inlet slide then closes and the next filling operation can start.

If, for example, sausage cans are to be filled, the entire cylinder volume can also be filled up.

By means of the process according to the invention, it is possible, as already mentioned, to maintain the supply space under atmospheric pressure during the filling of the filling cylinder.

The result of this is that even with a relatively low vacuum it is possible to generate such a high differential pressure between the filling funnel and the filling cylinder that the mass can be transferred into the filling cylinder in a very short time, as desired. Thus, since in the process according to the invention even a relatively low vacuum is sufficient to accelerate the transfer and remove air from the sausage meat, there is no danger that mass which is more fluid could be sucked up by the device generating the vacuum.

An apparatus of the type achieves the object sought because the orifice is so arranged and designed that the mass stream passing through it is guided towards the cylinder wall, because there is a sensor which detects the filling level during the filling of the filling cylinder, and because there is a regulating device which, during the downward movement of the piston during filling, controls the filling operation as a function of the signals from the sensor, in such a way that an essentially free space remains between the mass and the filling-cylinder cover.

Figure 4:
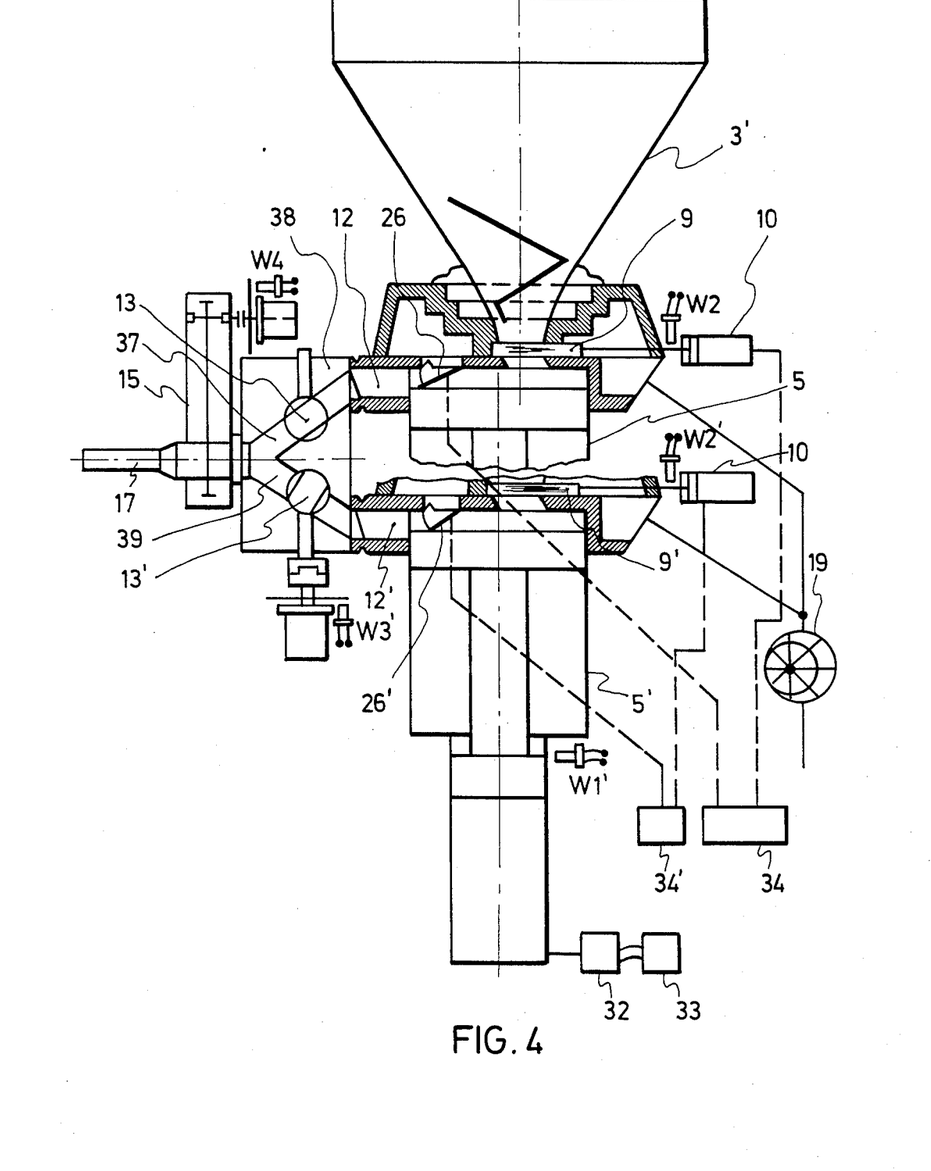
FIG. 4 is a diagrammatic sectional view of a further embodiment of the invention.

In the exemplary embodiment illustrated in FIG. 4, the apparatus comprises two cylinders 5 and 5', each of which is connected to a separate outlet orifice made in filling funnel 3'. A slide 9 and 9' is provided in each outlet orifice, the actual design in each case conforming to that according to the embodiment described in FIGS. 2 and 3. As also described above, slides 9 and 9' are respectively regulated by means of associated pivoting flaps 26 and 26'. The cylinders 5 and 5' are only indicated basically in the drawing and, in an actual exemplary embodiment, are, for example, arranged next to one another and at parallel heights under associated inlet slides 9 and 9'. The mode of operation corresponds essentially to that described previously. The outlet orifices 12 and 12' of the two cylinders 5 and 5' are brought together into a common filling tube 17 by means of channels 37 and 39 coverging in a unit 38. A rotary slide 13 and 13' is located in each of the two channels 37 and 39.

By means of this apparatus, large quantities of air-containing mass can be drawn off continuously, because the piston movement in each of the two cylinders 5 and 5' can be coordinated in such a way that, during the emptying of one cylinder, for example the cylinder 5, the other cylinder 5' is filled up, so that the cylinders are filled and emptied alternately.

By means of an appropriate alternating control of the rotary slides 13 and 13', a constant filling stream without any interruption is obtained at the filling tube 17.

In both the first and the second embodiment, it is possible to top up the filling funnels 3 and 3' at any time, since the filling funnels are open at the top to atmospheric pressure.

The inlet slides 9 and 9' are controlled by associated regulating devices 34 and 34', as already described previously. Accordingly, the inlet slides 9 and 9' have coresponding piston drives 10 and 10' connected to each. The particular position of each of the inlet slides is detected via the sensors W2 and W2' and utilized in the regulating circuit.

It is also not absolutely necessary, in this apparatus, to provide a shut-off meachnism 15, as illustrated, on the filling tube 17, but instead this apparatus can also be used for continuous filling, dividing into portions or feeding accessory machines, and in all cases the filling mass can be evacuated to a very low proportion of residual air, as described previously.

What we claim is:

1. In a process for drawing off deformable masses containing air in which the mass is transferred in a stream from a supply space into a filling cylinder where a vacuum is applied to the cylinder to remove air from the mass and in which the transferred mass is then ejected from the filling cylinder by a piston arranged in it, the improvement comprising drawing the mass into the top of the filling cylinder from the supply space by continously enlarging the filling cylinder by moving the piston away from the supply space to generate a vacuum inside the cylinder, deflecting the mass as it first enters the top of the filling cylinder towards a wall of the cylinder and at an angle to the shifting direction of the piston, and maintaining an essentially constant height of mass in the cylinder during filling, so that, during filling, an essentially constant volume of free space remains above the mass in the filling cylinder.

2. The process of claim 1, wherein, during filling, the free space is kept constant by regulating the cross-sectional opening of an orifice through which the mass stream passes from the supply space into the filling cylinder.

3. The process of claim 1, wherein air is removed from the top of the filling cylinder at a location diametrically opposite the point of impact of the mass stream on the cylinder wall.

4. The process of claim 1, wherein during the transfer of mass to the filling cylinder, the supply space is open to atmospheric pressure.

5. Apparatus for drawing off deformable masses containing air from a supply of mass and ejecting it in meterable quantities comprising a filling funnel for holding a supply of the mass, a filling cylinder having a piston arranged therein and connected to the filling funnel via an inlet orifice in the top of the cylinder, means for reciprocating the piston toward and away from the funnel whereby movement of the piston away from the funnel generates a vacuum in the cylinder for drawing mass from the funnel into the cylinder in the shifting direction of the piston, a slide for regulating the opening of the orifice and an outlet orifice in the cylinder through which mass in the cylinder can be ejected by shifting the piston toward the funnel, said inlet orifice being located and shaped so that it deflects the mass stream passing through it from the funnel to the cylinder toward and against a wall of the cylinder at an angle to the shifting direction of the piston, means for drawing a vacuum in the filling cylinder to remove air from the mass, means for sensing the level of mass in the cylinder during the filling of the cylinder and of the inlet orifice and/or the stroke of the piston to maintain an essentially constant volume of free space above the level of mass in the cylinder during filling.

6. The apparatus of claim 5, wherein the inlet orifice is off set laterally relative to the main axis of the cylinder, and where the means for drawing a vacuum is connected to an opening in the top of the cylinder approximately diametrically opposite from the location where the mass stream entering through the inlet orifice strikes the cylinder's wall.

7. The apparatus of claim 6 wherein the sensing means is a pivoting flap valve that floats on the surface of the mass in the cylinder, which valve also controls the size of the opening connected to the vacuum means.

8. The apparatus of claim 7 including a shroud having a cavity therein connected to the vacuum means and communicating with the opening in the top of the filling cylinder that is controlled by the flap valve.

9. The apparatus of claim 8 including a channel that communicates the inlet orifice with the cavity in the shroud.

10. The apparatus of claim 7, wherein the regulating means includes means for measuring the time elapsing between the opening of the orifice and the first floating of the pivoting flap by the mass in the cylinder, the regulating means operating as a function of this time.

11. The apparatus of claim 5, wherein the mass stream is deflected towards the cylinder wall as a result of the shape of the leading edge of the slide and the inlet orifice.

12. The apparatus of claim 5, wherein the regulating means controls the opening of the inlet orifice by regulating the position of the inlet slide to maintain said constant free space.

13. The apparatus of claim 5, wherein the filling funnel is open to the atmosphere.

14. The apparatus of claim 5, wherein the filling funnel is connected to two inlet orifices each of which is connected to one of a pair of filling cylinders and pistons and each of which is controlled by a separate inlet slide.

15. The apparatus of claim 14, wherein movement of the inlet slides is controlled independently of one another.

16. The apparatus of claim 15, wherein the pair of filling cylinders are connected to a common outlet orifice and wherein the ejection movement of the piston of one cylinder is coordinated with the filling up movement of the piston of the other cylinder so that a constant volume stream of mass can be ejected from the apparatus.

* * * * *